(12) United States Patent
Burch et al.

(10) Patent No.: US 8,449,669 B2
(45) Date of Patent: May 28, 2013

(54) GLOSS-ENHANCING COATING FOR INK-JET MEDIA

(75) Inventors: Eric L Burch, San Diego, CA (US); Douglas E Knight, San Diego, CA (US); Christopher Toles, Escondido, CA (US); David Rossing, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 13/286,076

(22) Filed: Oct. 31, 2011

(65) Prior Publication Data

US 2012/0279423 A1  Nov. 8, 2012

Related U.S. Application Data

(62) Division of application No. 11/796,639, filed on Apr. 27, 2007, now Pat. No. 8,048,497.

(51) Int. Cl.
*C09D 1/00* (2006.01)
*C09D 5/00* (2006.01)

(52) U.S. Cl.
CPC ... *C09D 5/00* (2013.01); *C09D 1/00* (2013.01)
USPC ...... 106/287.34; 106/661; 106/665; 106/666; 106/809; 106/810; 106/243; 106/266; 106/272; 106/287.2; 524/493

(58) Field of Classification Search
USPC ................. 106/661, 665, 666, 809, 810, 243, 106/266, 272, 287.2, 287.34; 524/493
See application file for complete search history.

(56) References Cited

U.S. PATENT DOCUMENTS

| | | | |
|---|---|---|---|
| 5,747,146 | A | 5/1998 | Kashiwazaki et al. |
| 5,750,200 | A | 5/1998 | Ogawa et al. |
| 5,952,051 | A | 9/1999 | Asano et al. |
| 6,096,157 | A | 8/2000 | Imabeppu et al. |
| 6,187,430 | B1 | 2/2001 | Mukoyoshi et al. |
| 6,203,899 | B1 | 3/2001 | Hirose et al. |
| 6,245,422 | B1 | 6/2001 | Onishi et al. |
| 6,497,941 | B1 | 12/2002 | Landry-Coltrain et al. |
| 6,632,485 | B1 | 10/2003 | Tang et al. |
| 6,863,392 | B2 | 3/2005 | Shimomura et al. |
| 6,964,992 | B2 | 11/2005 | Morris et al. |
| 8,048,497 | B2 * | 11/2011 | Burch et al. ............ 428/32.21 |
| 2006/0172093 | A1 | 8/2006 | Watanabe et al. |
| 2006/0182904 | A1 | 8/2006 | Ushiku et al. |
| 2006/0194005 | A1 | 8/2006 | Miyachi et al. |

FOREIGN PATENT DOCUMENTS

| | | |
|---|---|---|
| JP | 2000-211248 | 8/2000 |
| KR | 10-2004-0093192 | 5/2006 |
| WO | WO 03/003391 | 1/2003 |

OTHER PUBLICATIONS

Nissan Chemical-Colloidal Silica (7 pages).

* cited by examiner

*Primary Examiner* — David M Brunsman

(57) ABSTRACT

The present invention is drawn to a composition for cast-coating on ink-jet media. The composition includes a liquid vehicle, silica particulates, and an internal release agent. The composition is substantially free of polymeric binder and can improve the glossiness of a porous particulate-coated ink-receiving media by at least 2 gloss units at 20 degrees. The silica particulates can be suspended in the liquid vehicle at about 1-35 wt %, and can have a particle size of less than about 150 nm. The internal release agent can be present at about 0.5-10 wt %.

10 Claims, No Drawings

GLOSS-ENHANCING COATING FOR INK-JET MEDIA

RELATED APPLICATIONS

This application is a divisional of U.S. patent application Ser. No. 11/796,639, filed Apr. 27, 2007 now U.S. Pat. No. 8,048,497, which is incorporated herein by reference in its entirety.

BACKGROUND OF THE INVENTION

Papers used for ink-jet printing often come in a variety of types of surface finishes. Typically, these surface finishes are categorized according to the level of glossiness, such as gloss, semi-gloss, and matte. In many applications, gloss, even if in a small amount, can be desirable, such as with photo paper. In such cases, it can be very costly to formulate coatings that provide an adequate amount of gloss without losing other desirable qualities of the media such as water fastness, bleed control, etc. Often times, this requires the use of a greater quantity of materials and/or use of higher-quality or more expensive materials. Both can greatly increase the manufacturing costs. Additionally, the use of some materials in coatings prohibits their use with particular manufacturing methods, such as cast-coating.

It is desirable, therefore, to create an ink-jet media that provides glossiness without adversely affecting desirable properties of the media. It is also desirable to provide the media in a manner that can be easily manufactured and does not drastically increase the cost.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" refers to the fluid in which silica can be dispersed to form a composition in accordance with embodiments of the present invention. Many liquid vehicles and vehicle components are known in the art. Typical liquid vehicles can include a single substance or a mixture of a variety of different agents, such as co-solvents, buffers, and viscosity modifiers. In one embodiment, the liquid vehicle can comprise or consist essentially of water.

"Base paper" includes any unextruded or uncoated paper that can include fibers, fillers, and/or additives, etc. Examples of fillers and additives include wood, clay, kaolin, calcium carbonate, gypsum, titanium oxide, talc, alumina trihydrate, magnesium oxide, minerals, synthetic fillers, natural fillers, and combinations thereof.

"Substrate" includes any base material that can be coated in accordance with an embodiment of the present invention, such as base paper or other paper substrates, film base substrates, polymeric substrates, and the like. Further, pre-coated substrates, such as substrates coated with a porous-particulate ink-receiving layer, can also be used in embodiments of the present invention as well.

As used herein, the term "gloss" refers generally to the amount of light reflected by an object's surface, such as an ink-jet media surface. Gloss can be quantified, as is common in the art, and is measured relative to specific specular angles from an object surface. The specular angle is the angle equal to but opposite the angle of incidence. This specular light is responsible for the highlights visible on shiny materials. When quantifying gloss, it can be measured at angles of 20 degrees, 60 degrees, and 85 degrees off of the normal. Additionally, another angle of measurement, known as TAPPI Gloss, is measured at 75 degrees off the normal. ASTM Designation D523 specifies that a 60 degree measurement angle may be used for most materials. The test method recommends the use of a 20 degree measurement angle when the 60 degree gloss value is greater than 70, which indicates a highly-reflective material. The use of an 85 degree measurement angle is recommended when the 60 degree gloss value is less than 10, which indicates a less-reflective material. Gloss measurements are indicated by gloss units in relation to the angle used for measurement.

As used herein, "wetting agent" refers to a type of surface active agent. Such agents are typically amphipathic molecules consisting of a nonpolar hydrophobic portion, which is attached to a hydrophilic polar or ionic portion. Wetting agents can be used in the present invention to disperse components of the composition, such as the internal release agent and/or silica particulates.

"Internal release agent" refers to substances that are added into a liquid coating and which migrate to an interface to control or eliminate adhesion between two surfaces. Internal release agents act by lessening intermolecular interactions between two surfaces in contact, e.g. coated paper and coating drum, or by preventing such close contact between two surfaces. Internal release agents can be materials based on aliphatic hydrocarbon or fluorocarbon groups, and/or they can be particulate solids. Non-limiting examples of internal release agents can include certain types of waxes, fatty acid metal soaps, long-chain alkyl derivatives, polymers, and fluorinated compounds. Internal release agents will also tend to phase separate from the liquid.

As used herein, "gsm" represents grams per square-meter.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

With this in mind, it has been recognized that it would be advantageous to provide a composition for coating a substrate that can improve gloss without adversely affecting the print quality of the substrate. Further, the composition can be formulated for use with cast-coating, that will allow for a media with a fine gloss finish to be removable from a cast-coating drum. In one embodiment, a composition for cast-coating on ink-jet media can include a liquid vehicle, a plurality of silica particulates suspended in the liquid vehicle, and an internal release agent. The silica particulates can be present in an amount from about 1 wt % to about 35 wt %. Silica particulates of the present invention can be of a size less than about 150 nm. The internal release agent can be present in an amount from 0.5 wt % to 10 wt %. The coating can be substantially free of any polymeric binder. When cast-coated over a porous particulate-coated ink-receiving media to a coat weight of less than 2 gsm, the coating can produce an increase in the gloss of the media of at least 2 gloss units at 20 degrees. Further, the coating can be formulated so as to have a surface energy greater than the surface energy of a cast-coating drum used to apply the composition.

In one aspect, the composition can further include a wetting agent dispersed in the liquid vehicle. Such wetting agent can be utilized to assist the coating to properly wet the paper. Where the coat weight is generally low, the wetting agent can be used to more evenly spread the components of the composition onto the media. Therefore, the wetting agent can assist in wetting the media. In other words, the wetting agent can help the coating to spread on the media by altering the surface energy of the liquid.

The wetting agent can also serve to keep the internal release agent in the composition. Many commercially-available internal release agents are sold in water-based emulsions that include wetting agents. The wetting agents can be particularly useful with primarily-hydrophobic internal release agents such as, for example, calcium stearate. Wetting agents can essentially stick to the surface of the hydrophobic internal release agent and keep them suspended in the liquid vehicle. Wetting agents can also improve compositions by stabilizing the compositions generally, e.g. effectively improving the suspension of substantially all particulate components. Therefore, the addition of wetting agents to the composition can prevent the components from aggregating and/or floating to the top or sinking to the bottom of the composition.

As described, the composition includes an internal release agent. Such internal release agent can consist of or comprise a single internal release agent, or a plurality of internal release agents. The primary role of the internal release agent is to migrate to the interface between the coating and the casting drum in order to modify the surface energy of the interface so as to allow for proper release from the casting drum. Such modification of the interface allows for a smooth processing run of direct cast-coating the composition onto a media substrate. Adding an internal release agent will typically reduce the wettability of the coating on the cast-coating drum. The internal release agent can reduce the wettability of the coating by making the spreading coefficient of the coating on the cast-coating drum negative. However, there is a point when the liquid interface is highly crowded and does not allow for room for additional internal release agent to have an impact on the surface tension. Such state is known as the critical micelle concentration. The critical micelle concentration of many coated gloss compositions in accordance with embodiments of the present invention can be from about 30 dynes/cm to about 35 dynes/cm.

The amount of internal release agent used is dependent on a variety of factors. Enough internal release agent should be used so as to cause the coated media substrate surface energy (including the uppermost gloss-improving coat) to have a surface energy greater than the surface energy of the cast coating drum. This difference in the surface energy ensures proper release of the coated media substrate from the cast-coating drum. Thus, the coating can be effectively used in a cast-coating process. The surface energy of the gloss-improving composition can, therefore, vary at least according to the casting drum. Casting drums can be composed of a variety of materials, typically metals and alloys. Casting drums may also include a coating, such as an oxide layer, which can alter the surface energy of the casting drum.

In accordance with embodiments of the present invention, various internal release agents can be used in the gloss-improving compositions. Internal release agents can be organic or inorganic. Non-limiting examples of internal release agents include metal stearates, polyethylene emulsions, beef tallow, waxes, ketene dimmer, fatty acid metal soaps, and sulfonated oil surfactants. In one embodiment, the internal release agent can be a wax, such as a petroleum, vegetable, animal, and/or synthetic wax. Non-limiting examples of metal stearates include calcium stearate and magnesium stearate. In a specific embodiment, the internal release agent can comprise or consist essentially of calcium stearate. The internal release agent can include a single internal release agent or a plurality of internal release agents.

The silica used in the gloss-improving composition can be a variety of forms. Preferably, the silica is of a particle size of less than about 150 nm. Such measurement is based on dynamic light scattering, and indicates the average particle size. In one embodiment, the silica can comprise or consist essentially of colloidal silica. In another embodiment, the silica can comprise or consist essentially of fumed silica. In still another embodiment, the silica can comprise or consist essentially of precipitated grades of silica. In yet another embodiment, the silica can comprise or consist essentially of gelled grades of silica. The silica can be treated or processed prior to use. In one aspect, the silica can be nanomilled to the preferred size. Such milling is often particularly useful with gelled and precipitated forms of silica.

In one embodiment, the silica can be cationic. The silica can be treated by any of the techniques known in the art to produce a cationic silica, including but not limited to treatment by aluminum chlorohydrate or various aminosilane compounds. By including cationic silica in the gloss-improving composition, the resulting coating will show an improved dye adhesion, thus improving overall print performance. Improved dye adhesion can improve many coating properties; more specifically, it can decrease bleed and generally improve color performance.

In accordance with these embodiments, various details are provided herein which are applicable to each of the coating composition, printing media, and associated methods. As such, general discussion of any one of these embodiments is relevant to the other embodiments.

A method for improving gloss on ink-jet media can include applying certain coatings to a substrate. The substrate can include a porous particulate-coated ink-receiving layer coated thereon. If not, then such coating can be applied on a substrate. Onto the ink-receiving layer, a gloss-improving composition as discussed herein, including a liquid vehicle, silica particulates, and internal release agent, can be cast-coated thereon. The gloss-improving composition can be applied to a coat weight of less than about 2 gsm. In one embodiment, the composition can be applied to a coat weight of less than about 1 gsm. In another embodiment, the gloss-improving composition can be applied to a coat weight of about 0.5 gsm to about 2 gsm.

The substrate can be a variety of materials. Most substrate materials are known in the art. Non-limiting examples of materials that can be used as substrate include filled- and non-filled raw base paper, which may include fibers, fillers, additives, etc. Examples of fillers and additives include wood, clay, kaolin, calcium carbonate, gypsum, titanium oxide, talc, alumina trihydrate, magnesium oxide, minerals, synthetic fillers, natural fillers, and combinations thereof. In addition to the ink-receiving layer, the substrate can include additional coatings, such as a curl control layer. In one embodiment, the coated substrate can be ink-jet ink printing media. In another embodiment, the ink-jet printing media can be photo paper.

As the function of the gloss-improving composition is to improve gloss, it is preferable, although not required, that the ink-receiving layer that is overcoated with the gloss-improving composition should have some gloss itself. In one aspect, the gloss-improving composition can improve gloss by at least 2 gloss units at 20 degrees. In other embodiments, the gloss-improving composition can produce a gloss increase of at least 5 gloss units at 20 degrees. In still other embodiments, the gloss-improving composition can produce a gloss increase of at least 10, or at least 15, or at least 20 gloss units, all measured at 20 degrees.

In one aspect, the substrate with the porous particulate-coated ink-receiving layer can be calendared prior to cast-coating the gloss-improving composition thereon. Such calendaring, in many cases, can increase the level of improvement in gloss seen when the gloss-improving composition is applied. In one embodiment, the gloss of an uncalendared ink-receiving layer can be increased by about 2 to about 10 gloss units at 20 degrees when the gloss-improving composition is applied. In another embodiment, the gloss of a calendared ink-receiving layer can be increased by about 15 to about 30 gloss units at 20 degrees when the gloss-improving composition is applied.

In accordance with additional embodiments of the present invention, an ink-jet media can include a substrate, porous particulate-coated ink-receiving layer coated on the surface of the substrate, and a gloss-enhancing composition coated onto the ink-receiving layer. The gloss-enhancing composition can increase the gloss by at least 2 gloss units at 20 degrees over the gloss of the porous particulate-coated ink-receiving media.

By coating an ink-receiving layer with the gloss-enhancing composition taught above and herein, the glossiness of the media can be improved. Such improvement can occur regardless of many of the features of the ink-receiving layer. As such, the gloss-enhancing composition can be used as an effective tool to improve the quality of many ink-jet media substrates, including those of lower-quality. The gloss-improving composition can be used in small amounts (e.g. coat weight less than about 2 gsm), and therefore does not require great expenditure for the gloss improvement. Furthermore, the relatively thin layer of the composition effectively maintains the image quality of the ink-receiving layer on the media. Additionally, the composition can be used in direct cast-coating, as it can be formulated so as to properly release from a casting drum.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein. Unless specific cast coating equipment is noted, the examples were coated using a simulated cast-coating method, wherein a thin layer of composition is coated on the media and pressed against a mirror-polished and heated chrome plate. The coated media is held in contact with the heated plate. In plant-scale cast coating operations, a composition is applied to a media and the media is then stretched over a heated mirror-polished chrome drum to cast the coat.

Example 1

Preparation of Gloss-Improving Composition

A composition was prepared by mixing 1000 g of cationic colloidal silica having a mean particle diameter of 100 nm, 0.02 g of nonylphenoxypolyglycidol, and 15 g of calcium stearate emulsion. The components were mixed in a beaker and stirred using an overhead mixer for approximately 20 minutes to ensure full incorporation of the materials.

Example 2

Coating Composition onto Media

The composition of Example 1 was coated using a Meyer Rod drawdown onto two different types of ink-jet paper—one type calendared and the other type uncalendared. Both papers include a porous-type ink-receiving layer including silica, binder and surfactant. The coating of each gloss-improving composition was to a coat weight of 0.5 gsm.

Example 3

Gloss Measurements

The ink-jet papers used in Example 2 were measured for gloss at 20 degrees before and after the application of the gloss-improving composition. The results are in Table 1.

TABLE 1

| Media | Gloss before gloss-improving layer* | Gloss after gloss-improving layer* |
| --- | --- | --- |
| Uncalendared 1 | 1.8 | 3.7 |
| Uncalendared 2 | 1.8 | 11.2 |
| Calendared 1 | 4.2 | 23.3 |
| Calendared 2 | 4.2 | 31.4 |

*Gloss measurements at 20 degrees and reported in gloss units.

Example 4

Preparation of Gloss-Improving Composition

A larger batch of gloss-improving composition was made according to the procedure of Example 1. However, in this case, the mixture used 234 kg of cationic colloidal silica having a mean particle diameter of 558 nm, 4.7 g of nonylphenoxypolyglycidol and internal release agent.

Example 5

Coating Composition onto Media

The formulation of Example 4 was cast-coated onto three base papers (labeled A, B, and C) which were pre-coated with a porous inkjet coating comprising silica, binder and surfactants. The coating of each gloss-improving composition was to a coat weight of less than 1.5 gsm.

The coating was done using a plant-scale chrome coating roll running at a webspeed of 35 feet per minute, drum temperature of 160° F. and nip pressure of approximately 300 psi.

Example 6

Gloss Measurements

The ink-jet papers coated in Example 5 were measured for gloss at 20 degrees before and after the application of the gloss-improving composition. The results are in Table 2.

TABLE 2

| Media | Coat Weight (gsm) | Gloss before gloss-improving layer* | Gloss after gloss-improving layer* |
|---|---|---|---|
| Base A | 1.17 | 4.1 | 32.0 |
| Base C | 0.67 | 4.0 | 33.0 |
| Base D | 0.33 | 9.5 | 38.9 |

*Gloss measurements at 20 degrees and reported in gloss units

Example 7

Preparation of Gloss-Improving Composition

A composition was prepared by mixing 100 g of cationic colloidal silica (32 wt % solids dispersion), with a mean particle diameter of 50 nm, 0.02 g of nonylphenoxypolyglycidol surfactant, and 1.5 g of calcium stearate emulsion (53 wt % solids) and sufficient water to bring the total solids of the coating composition to 14%. The components were mixed in a beaker and stirred to ensure full incorporation of the materials.

Example 8

Coating Composition onto Media

The composition of Example 7 was coated using a #2.5 Meyer Rod drawdown onto a pre-coated porous ink-jet paper. This base paper precoated comprised silica, binder and surfactants. The coating of the gloss-improving composition was to a coat weight of 1 gsm. After application using the meyer rod, the sheet was cast against a heated (60° C.) mirror-finish chrome plate using a roller to simulate a plant-scale cast-coating system.

Example 9

Gloss Measurements

The ink-jet paper prepared in Example 8 was measured for gloss at 20 and 60 degrees before and after the application of the gloss-improving composition. The results are in Table 2. The results are averages of 3 measurements each and represent a statistically significant difference ($p=0.02$)

| Media | 20° Gloss before gloss-improving layer* | 60° Gloss before gloss-improving layer* | 20° Gloss before gloss-improving layer* | 60° Gloss before gloss-improving layer* |
|---|---|---|---|---|
| Ex 7 | 4 | 21 | 5 | 30 |

*Gloss measurements at 20 degrees and reported in gloss units.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A composition for cast-coating on ink-jet media using a cast-coating drum, comprising:
    a liquid vehicle;
    a plurality of silica particulates suspended in the liquid vehicle in an amount of about 1 wt % to about 35 wt %, said silica particulates having a particle size less than about 150 nm; and
    from 0.5 wt % to 10 wt % of internal release agent,
    wherein the composition is substantially free of a polymeric binder, and wherein the composition, when cast-coated on a porous particulate-coated ink-receiving media to a coat weight of less than 2 gsm, produces a gloss increase of at least 2 gloss units at 20 degrees over the gloss of the porous particulate-coated ink-receiving media, and wherein the composition has a surface energy greater than the surface energy of the cast-coating drum.

2. A composition as in claim 1, further comprising a wetting agent dispersed in the liquid vehicle.

3. A composition as in claim 1, wherein internal release agent is selected from the group consisting of metal stearates, polyethylene emulsions, beef tallow, waxes, ketene dimmer, fatty acid metal soaps, and sulfonated oil surfactants.

4. A composition as in claim 1, wherein the internal release agent includes calcium stearate.

5. A composition as in claim 1, wherein the liquid vehicle includes water.

6. A composition as in claim 1, wherein the silica includes cationic silica.

7. A composition as in claim 1, wherein the silica includes colloidal silica.

8. A composition as in claim 1, wherein the silica includes fumed silica.

9. A composition as in claim 1, wherein the silica includes nanomilled precipitated or gelled silica.

10. A composition as in claim 1, wherein the internal release agent includes more than one internal release agent.

* * * * *